Nov. 25, 1958     H. H. C. RICHARDS, JR., ET AL     2,862,111
AUTOMATIC PARALLELING SYSTEM
Filed Dec. 10, 1957
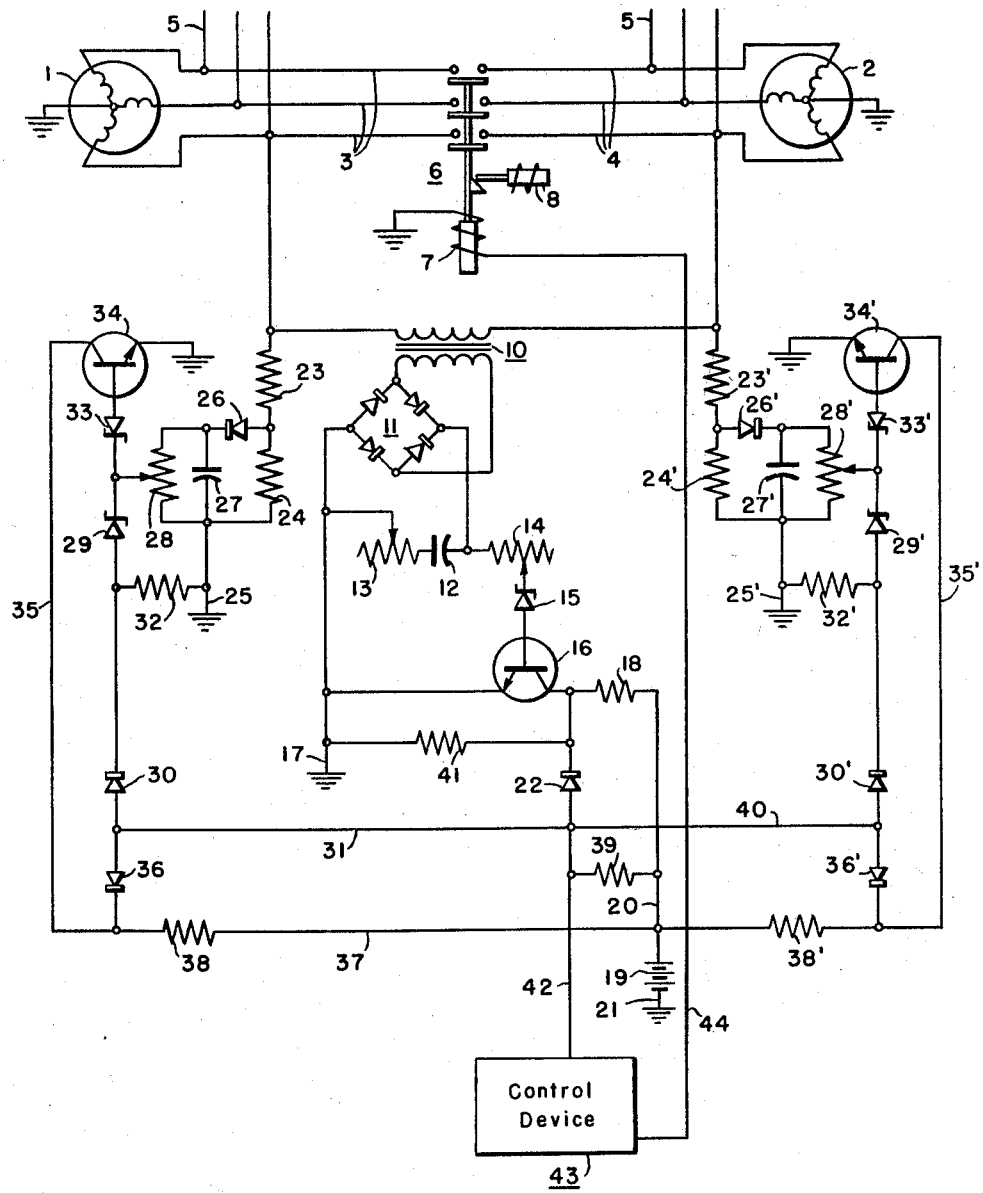
WITNESSES
INVENTORS
Harrison H. C. Richards, Jr.
Lewis R. Lowry, Jr.
BY
ATTORNEY

United States Patent Office 2,862,111
Patented Nov. 25, 1958

2,862,111

AUTOMATIC PARALLELING SYSTEM

Harrison H. C. Richards, Jr., American Township, Allen County, and Lewis R. Lowry, Jr., Lima, Ohio, assignors to Westinghouse Electric Corporation, East Pittsburgh, Pa., a corporation of Pennsylvania Application December 10, 1957, Serial No. 701,754

10 Claims. (Cl. 307—87)

The present invention relates to automatic paralleling of alternating current generators, and more particularly, to a static system for controlling the connection of an alternating current generator to an energized line or bus for operation in parallel with one or more other generators.

When an alternating current generator is to be operated in parallel with one or more other generators, the generators must be close to synchronism with each other when they are connected together, or when the incoming generator is connected to a line or bus to which the other generators are already connected. This means that the voltage, frequency and phase angle of the incoming generator and the line must be the same, or within predetermined limits, to prevent excessive system transients and so that the incoming generator will synchronize with the line and operate properly in parallel with the other generators.

When the generators are provided with control means or regulators which hold the frequency and voltage of the generators close to the desired values, paralleling can be accomplished by providing sensing means for sensing the voltage, frequency and phase angle differences between the generators. The sensing means is then used to control the circuit breaker of the incoming generator to cause the breaker to close at the correct instant when the incoming generator is sufficiently close to synchronism.

Electromagnetic relays have been used heretofore for this purpose but such relays have serious disadvantages in certain applications, such as in aircraft electrical systems. Electromagnetic relays must be carefully calibrated and adjusted and must necessarily be quite sensitive to respond accurately to small frequency and phase differences. It is very difficult, however, to maintain the required accuracy of calibration of these sensitive relays under the severe conditions of aircraft use, where the relays are subjected to large acceleration forces, severe vibration, extreme temperatures, and other adverse environmental conditions. Relays of the type previously used are also relatively bulky, which is undesirable in aircraft systems where the size and weight must be kept to a minimum. Thus, the automatic paralleling systems which have been used heretofore including electromagnetic relays, are not desirable for aircraft use because they are not sufficiently reliable and can not be made as small and compact as is necessary.

The principal object of the present invention is to provide a static system for effecting paralleling of alternating current generators which uses only static components of small size and high reliability, so that the system can be made very small and compact but is highly reliable since no sensitive relays or other devices requiring accurate calibration are used.

Another object of the invention is to provide a static paralleling system which senses the voltages of an incoming generator and an energized line, and the difference in frequency and phase angle between the generator and the line, and which provides an output signal to effect connection of the incoming generator to the line when these quantities are within predetermined limits.

A further object of the invention is to provide a static sensing circuit for sensing the frequency and phase difference between two generators, or between a generator and an energized line, and which is relatively insensitive to changes in the magnitudes of the voltages.

Other objects and advantages of the invention will be apparent from the following detailed description, taken in connection with the accompanying drawing, the single figure of which is a schematic diagram showing an illustrative embodiment of the invention.

The invention is shown in the drawing embodied in a system for controlling the paralleling of two alternating current generators 1 and 2. The generators 1 and 2 may be any desired type of alternating current generator and are shown as three-phase generators, which are preferably Y-connected with the neutral points grounded. The generators 1 and 2 are connected to three-phase lines or buses 3 and 4, respectively, for supplying load buses 5. The generators are connected together for parallel operation by means of a circuit breaker 6 which connects the buses 3 and 4 together. The circuit breaker 6 may be any suitable type of breaker and is shown as having a closing coil 7 which is controlled automatically, as hereinafter described, and which may also be provided with any desired additional means for automatic or manual operation. The breaker 6 also has a trip coil 8 which may be contholled manually or automatically in any desired manner. The system thus far described is to be taken as representing any system in which an alternating current generator is to be connected for operation in parallel with one or more other generators, and the circuit breaker 6 represents any suitable switching means for connecting an incoming generator to an already energized line or generator.

As previously discussed, the circuit breaker 6 must be controlled so that it is closed only when the incoming generator is close enough to synchronism with the line to permit paralleling. The circuit breaker 6, therefore, must be controlled so that it can close only when the voltages, frequencies and phase relation of the incoming generator and the line are close enough to enable the generator to pull into synchronism. In accordance with the present invention, static sensing means are provided for sensing these quantities and for providing an energizing signal to the close coil 7 of the circuit breaker 6 when the conditions are correct to permit paralleling. For this purpose, the system includes separate means for sensing the frequency and phase difference between the generator and the line, and the voltage levels of the generator and the line, the output signals of these sensing means being combined to effect operation of the breaker at the correct instant.

The sensing means for sensing frequency and phase difference includes a transformer 10 which has its primary winding connected, as shown, to corresponding phase voltages of the two generators which are in phase when the generators are in synchronism. The primary winding of transformer 10, therefore, is connected so that the voltages of the two generators subtract vectorially and the output voltage of the transformer secondary is at its maximum value when these voltages are 180° out-of-phase and is at a minimum when they are exactly in phase, while the output voltage pulsates at a frequency equal to the frequency difference between the two generators. The output voltage of the transformer 10, therefore, is a measure of the phase and frequency difference between the two generators and decreases as they approach synchronism.

A full-wave rectifier bridge 11 is connected across the secondary winding of the transformer 10, and it will be seen that the direct current output voltage of the rectifier 11 will vary with the phase difference between the generators and will contain a ripple of frequency equal to the frequency difference or beat frequency between the two generators. Thus, the average direct current output voltage of the rectifier 11 is proportional to the beat frequency and phase difference between the generators and decreases as these become smaller. A filter circuit consisting of a capacitor 12 and, if desired, an adjustable resistor 13 is connected across the output of the rectifier 11 to reduce the ripple without changing the average value of the voltage. It will be seen that the filtered output voltage of the rectifier 11 provides a measure of the beat frequency and phase difference between the generators and decreases as they approach synchronism.

The filtered output voltage of the rectifier 11 is applied through an adjustable resistor 14 to a Zener diode 15 which is connected to the base of a transistor 16. The emitter of the transistor is connected to ground 17 so that the rectifier output voltage is connected across the base and emitter of the transistor through the Zener diode 15.

It will be understood that a Zener diode is a semiconductor diode, usually a silicon diode, which has the characteristic of being substantially nonconducting in the reverse direction as long as the voltage is below a predetermined breakdown value. When the reverse voltage exceeds this value, the diode conducts freely in the reverse direction but regains its rectifying characteristic when the reverse voltage again falls below this value. These devices are therefore essentially voltage-sensitive devices which permit current flow in the reverse direction only when the reverse voltage is above the predetermined value.

The value of the breakdown voltage of the diode 15 is selected so that it becomes nonconducting and cuts off current flow when the output voltage of the rectifier 11 falls below a value corresponding to the maximum beat frequency and phase difference at which paralleling of the generators 1 and 2 is to be accomplished, the exact voltage at which operation occurs being adjustable by means of the resistor 14. Thus, when the beat frequency and phase difference between the generators are too great, the diode 15 is conducting and current flows to the base of the transistor 16 making it conductive between the collector and emitter electrodes. The collector is connected through a resistor 18 to a direct current source, which may be any available source of direct current and which is shown diagrammatically as a battery 19 having its positive terminal connected to a direct current supply conductor 20 and its negative terminal connected to ground 21.

The direct current supply 20 is connected to the collector of the transistor 16 and the collector is also connected to a rectifier cell 22, which may be a semi-conductor diode or other suitable rectifier device, the rectifier being connected, as shown, in the reverse direction with respect to the voltage at the collector. It will be seen that when the transistor 16 is conductive, the direct current supply 20 is connected to ground 17 through resistor 18 and the transistor so that no output signal appears at the collector which is substantially at ground potential. When the diode 15 cuts off, however, the transistor 16 becomes nonconductive and the direct current supply voltage appears at the collector and is applied as a signal voltage to the rectifier 22. The rectifier 22 forms part of an And circuit, that is, a circuit which provides an output signal only when all of a plurality of input signals are present, which will be described more fully hereinafter.

As previously indicated, it is also necessary for the voltages of the generators to be substantially equal within relatively close limits to permit paralleling without excessive system transients. The system of the present invention therefore includes voltage sensing means for each generator. The voltage sensing means are identical for both generators and only one will be described in detail. The voltage sensing means for the generator 1 includes a voltage divider consisting of two resistors 23 and 24 connected in series between one phase of the generator 1 and ground 25. The voltage across the resistor 24 is rectified by a half-wave rectifier 26, a filter capacitor 27 preferably being provided to reduce the ripple, and this rectified voltage which is proportional to the generator voltage is applied to an adjustable potentiometer 28. Separate undervoltage and overvoltage sensing means respond respectively to the voltages across the two parts of the potentiometer.

The undervoltage sensing circuit includes a Zener diode 29 connected as shown across the voltage of one part of the potentiometer 28. When the generator voltage is within the desired range, the voltage applied to the diode 29 is high enough to exceed its breakdown voltage. The diode 29 is connected to a rectifier 30 in the reverse direction of the rectifier 30, so that when the diode 29 is conducting a reverse biasing voltage is applied to the rectifier 30. The rectifier 30 is part of the And circuit previously referred to and is connected to the direct current supply 20 through a conductor 31 and resistor 39. When the voltage of the generator is above the lower limit of the permissible voltage range, the Zener diode 29 is conducting and the rectifier 30 is biased in the reverse direction. If the generator voltage falls below the minimum permissible value, the diode 29 cuts off the signal to the rectifier 30 and current can flow through the rectifier from the direct current source 20 to ground 25 through a current limiting resistor 32.

The voltage sensing means also includes an overvoltage sensing circuit which includes a Zener diode 33 connected as shown to the potentiometer 28 and to the base of a transistor 34, the emitter of which is connected to ground so that the base and emitter are connected across the potentiometer voltage through the diode 33. The collector of the transistor 34 is connected through a conductor 35 to a rectifier 36 which is a part of the And circuit. The Zener diode 33 is selected so that when the voltage of the generator is below the maximum limit for paralleling, the diode 33 is not broken down and the transistor 34 is therefore nonconductive between the collector and emitter, since no current can flow to the base. The rectifier 36, under these conditions, is biased in the reverse direction from the direct current supply 20 through a conductor 37 and a resistor 38. If the voltage of the generator exceeds the maximum permissible value, however, the diode 33 breaks down and permits current to flow to the base of the transistor 34 so that the transistor becomes conductive and the direct current signal to the rectifier 36 is shunted to ground through the conductor 35.

As previously indicated, identical voltage sensing means are provided for the generator 2, the corresponding elements being designated by primed reference numerals. Thus, when the voltage of the generator 2 is above the minimum voltage, a reverse bias is applied to the rectifier 30', and when the voltage is below the maximum value, a reverse bias is applied to the rectifier 36'.

As previously stated, the rectifiers 22, 30, 30', 36 and 36' constitute an And circuit which is utilized in the illustrated embodiment to control the circuit breaker 6. The direct current supply 20 is connected through a resistor 39 to all five of the rectifiers in their forward directions through conductors 31 and 40. If no reverse bias signals are applied to any of the rectifiers, current can flow from the direct current source 20 through the rectifier 22 and resistor 41 to ground 17, through the rectifiers 30 and 30' and resistors 32 and 32' to ground, and through the rectifiers 36 and 36' and transistors 34 and 34' to ground when the transistors 34 and 34' are conductive.

The direct current source 20 is also connected through the resistor 39 and conductor 42 to a control device 43.

The control device 43 may be any suitable device, preferably a static device such as a bistable circuit or flip-flop or an amplifier, which will provide an output signal to a conductor 44 when a signal is applied through conductor 42 to the control device 43. The conductor 44 is connected to energize the closing coil 7 of the breaker 6 so that the breaker closes when a signal is applied to the control device 43 through the conductor 42.

If the voltage of either generator is above the maximum permissible value, the transistor 34 or 34' becomes conductive and the bias signal of the corresponding rectifier 36 or 36' is made ineffective. Similarly, if the voltage of either generator is below the minimum value, the diode 29 or 29' is cut off and the reverse bias is removed from the corresponding rectifier 30 or 30'. If the beat frequency or phase difference between the generators is too great, the transistor 16 will be conductive and the reverse bias signal is removed from the rectifier 22. Under any of these conditions, therefore, the direct current supply 20 is shunted to ground through the respective resistors and rectifier or rectifiers, and no signal appears on the conductor 42. If the voltages of both generators are within the desired range, however, bias signals are applied to the rectifiers 30, 30', 36 and 36'. When the beat frequency and phase difference between the generators then come within the permissible limits for paralleling, the output voltage of the rectifier 11 falls below the breakdown value of the diode 15, and transistor 16 becomes nonconductive so that a bias signal is applied to the rectifier 22. When all five rectifiers are thus biased in the reverse direction, the direct current supply 20 supplies a signal to the conductor 42 through resistor 39 which actuates the control device 43 to cause the breaker 6 to close and connect the generators in parallel. Thus, the generators can only be paralleled when the conditions are correct, that is, when signals are applied to the And circuit indicating that the voltages of both machines are within the predetermined range and that the beat frequency and phase difference are within the predetermined limits.

It should now be apparent that a static automatic paralleling system has been provided which has many advantages, especially for aircraft use, because it uses only small, rugged, static components so that the system is highly reliable and can be made very small and compact. It will also be apparent that various modifications and other embodiments of the invention are possible. Thus, if the complete electrical system includes protective devices or other means for responding to the voltages of the generators, the voltage sensing means may not be necessary and the frequency sensing means might be used alone to control the breaker for automatic paralleling. Such a beat frequency sensing circuit is also very useful in many other applications, and this circuit has the further advantage that the transformer 10 can be utilized to step the voltage down considerably so that the frequency sensing circuit is relatively insensitive to changes in the actual magnitude of the voltages of the generators.

Thus, a very advantageous automatic paralleling system has been provided which avoids the problems and difficulties of previous systems using electromagnetic relays and which has greater reliability than previous systems as well as providing very accurate control of the generator circuit breaker. Although a specific embodiment of the invention has been shown and described for the purpose of illustration, it will be understood that numerous other modifications and embodiments are possible and are within the scope of the invention.

We claim as our invention:

1. A system for effecting paralleling of an alternating current generator with an energized alternating current line, said system including switch means for connecting the generator to said line, sensing means energized by voltages of the generator and of the line which are in phase at synchronism, said sensing means being connected to provide an output voltage proportional to the difference in frequency between the generator and the line, and circuit means for effecting closing of said switch means when said output voltage falls below a predetermined value.

2. A system for effecting paralleling of an alternating current generator with an energized alternating current line, said system including switch means for connecting the generator to said line, sensing means energized by voltages of the generator and of the line which are in phase at synchronism, said sensing means being connected to provide an output voltage proportional to the difference in frequency between the generator and the line, rectifying means for rectifying said output voltage, and static circuit means for effecting closing of said switch means when the rectified voltage falls below a predetermined value.

3. A system for effecting paralleling of an alternating current generator with an energized alternating current line, said system including switch means for connecting the generator to said line, transformer means connected to be energized by corresponding voltages of the generator and the line to provide an output voltage proportional to the difference in frequency and phase between the generator and the line, and circuit means for effecting closing of said switch means when said output voltage falls below a predetermined value.

4. A system for effecting paralleling of an alternating current generator with an energized alternating current line, said system including switch means for connecting the generator to said line, transformer means connected to be energized by corresponding voltages of the generator and the line to provide an output voltage proportional to the difference in frequency and phase between the generator and the line, means for rectifying said output voltage, and static circuit means for effecting closing of said switch means when the rectified voltage falls below a predetermined value.

5. A system for effecting paralleling of an alternating current generator with an energized alternating current line, said system including switch means for connecting the generator to said line, transformer means connected to be energized by corresponding voltages of the generator and the line to provide an output voltage proportional to the difference in frequency and phase between the generator and the line, means for rectifying said output voltage, static voltage-responsive means connected to the rectifying means to provide an output current when the rectified voltage is above a predetermined value, and static circuit means controlled by said output current to effect closing of said switch means in the absence of the output current.

6. A system for effecting paralleling of an alternating current generator with an energized alternating current line, said system including switch means for connecting the generator to said line, transformer means connected to be energized by corresponding voltages of the generator and the line to provide an output voltage proportional to the difference in frequency and phase between the generator and the line, voltage sensing means for said generator and for said line, and static circuit means for effecting closing of said switch means when said output voltage falls below a predetermined value and the voltages of the generators and of the line are within a predetermined range.

7. A system for effecting paralleling of an alternating current generator with an energized alternating current line, said system including switch means for connecting the generator to said line, transformer means connected to be energized by corresponding voltages of the generator and the line to provide an output voltage proportional to the difference in frequency and phase between the generator and the line, static circuit means for providing a signal voltage when said output voltage is below a predetermined value, voltage sensing means for said generator and for said line adapted to provide signal voltages when the voltages of the generator and of the line are within a predetermined range, and means for effecting closing of said switch means when all of said signal voltages are present.

8. A system for effecting paralleling of an alternating current generator with an energized alternating current line, said system including switch means for connecting the generator to said line, transformer means connected to be energized by corresponding voltages of the generator and the line to provide an output voltage proportional to the difference in frequency and phase between the generator and the line, static circuit means for providing a signal voltage when said output voltage is below a predetermined value, static voltage sensing means for providing signal voltages when the voltages of the generator and of the line are above a predetermined value, static voltage sensing means for providing signal voltages when the voltages of the generator and of the line are below a higher predetermined value, and means for effecting closing of said switch means when all of said signal voltages are present.

9. A system for effecting paralleling of an alternating current generator with an energized alternating current line, said system including switch means for connecting the generator to said line, transformer means connected to be energized by corresponding voltages of the generator and the line to provide an output voltage proportional to the difference in frequency and phase between the generator and the line, means for rectifying said output voltage, static voltage-responsive means connected to the rectifying means to provide an output current only when the rectified voltage is above a predetermined value, static circuit means controlled by said output current to provide a signal voltage only when said output current ceases, voltage sensing means for said generator and for said line adapted to provide signal voltages when the voltages of the generator and of the line are within a predetermined range, and means for effecting closing of said switch means when all of said signal voltages are present.

10. A system for effecting paralleling of an alternating current generator with an energized alternating current line, said system including switch means for connecting the generator to said line, transformer means connected to be energized by corresponding voltages of the generator and the line to provide an output voltage proportional to the difference in frequency and phase between the generator and the line, means for rectifying said output voltage, static voltage-responsive means connected to the rectifying means to provide an output current only when the rectified voltage is above a predetermined value, static circuit means controlled by said output current to provide a signal voltage only when said output current ceases, static voltage sensing means for providing signal voltages when the voltages of the generator and of the line are above a predetermined value, static voltage sensing means for providing signal voltages when the voltages of the generator and of the lines are below a higher predetermined value, and means for effecting closing of said switch means when all of said signal voltages are present.

No references cited.